(12) United States Patent  (10) Patent No.: US 9,022,050 B2
Jeziorski  (45) Date of Patent: May 5, 2015

(54) HUNTING BLIND

(76) Inventor: Leonard Jeziorski, Crawfordville, FL (US)

( * ) Notice: Subject to any disclaimer, the term of this patent is extended or adjusted under 35 U.S.C. 154(b) by 0 days.

(21) Appl. No.: 13/358,187

(22) Filed: Jan. 25, 2012

(65) Prior Publication Data

US 2013/0186443 A1    Jul. 25, 2013

(51) Int. Cl.
*E04H 15/04*   (2006.01)
*A01M 31/02*   (2006.01)

(52) U.S. Cl.
CPC ........... *A01M 31/025* (2013.01); *Y10S 135/901* (2013.01)

(58) Field of Classification Search
USPC ............. 135/115, 117, 118, 90, 901, 913, 99, 135/100; 43/1–3
See application file for complete search history.

(56) References Cited

U.S. PATENT DOCUMENTS

| 646,421 | A | * | 4/1900 | Fisher | 2/89 |
| 4,922,942 | A | * | 5/1990 | Schaeffer | 135/90 |
| 5,199,214 | A | * | 4/1993 | Caldwell | 47/42 |
| 5,408,782 | A | * | 4/1995 | McConnell | 182/187 |
| 6,202,354 | B1 | * | 3/2001 | Kirby | 52/4 |
| 6,434,877 | B1 | * | 8/2002 | Shelton | 43/1 |
| 7,650,899 | B2 | * | 1/2010 | Eastman et al. | 135/120.1 |
| 8,336,252 | B1 | * | 12/2012 | Ammons | 47/42 |
| 8,407,936 | B1 | * | 4/2013 | Lee, Jr. | 47/67 |
| 2007/0144570 | A1 | * | 6/2007 | Cooper | 135/90 |

* cited by examiner

*Primary Examiner* — Noah Chandler Hawk
(74) *Attorney, Agent, or Firm* — Adrienne C. Love

(57) ABSTRACT

The present invention is a hunting blind configured to attach to a tree. The hunting blind includes a top member with two ends and multiple arms. The top member wraps around the tree and each arm extends downward and outward away from the tree. The arms are staked into the ground in the desired position such that a hunter can sit in the opening formed by the hunting blind.

20 Claims, 5 Drawing Sheets

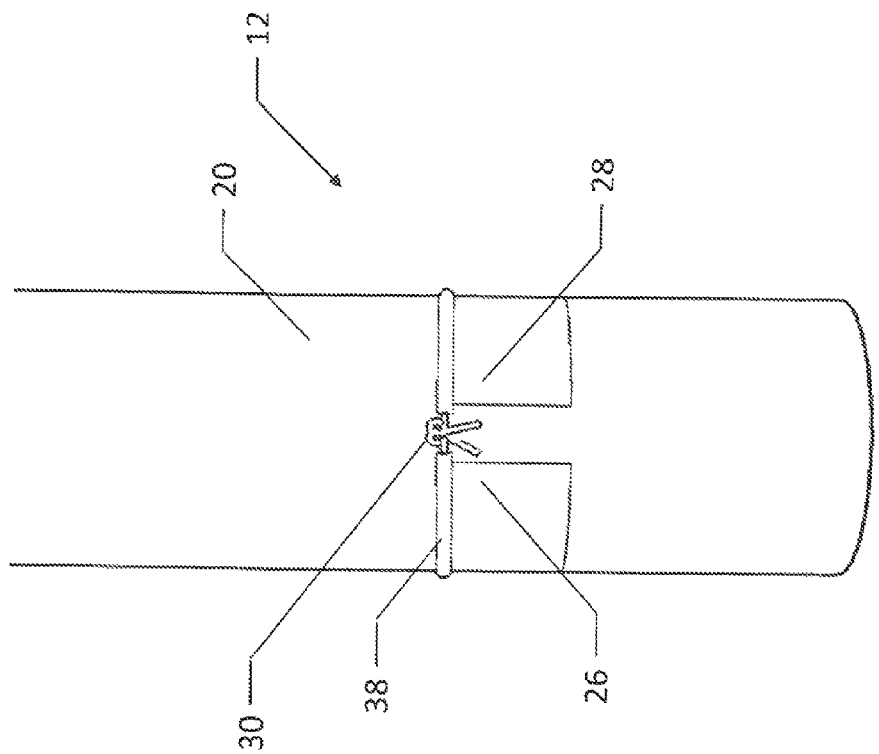

HUNTING BLIND

BACKGROUND OF THE INVENTION

1. Field of the Invention

This invention relates to blinds used by hunters for hunting animals. More specifically, the invention comprises a hunting blind which attaches to a tree and has multiple branching arms.

2. Description of the Related Art

Hunting blinds are often used during hunting. Typically hunting blinds are made of camouflage fabric or wood and are either self-supported or are attached to an existing fixture such as a tree. Hunters utilize the hunting blinds in order to hide from the view of animals in order to get the best shot possible. Hunting blinds can be used for hunting animals such as turkey, duck or deer. It is difficult for the animals to detect movement when the hunter is inside of or obstructed by the hunting blind; therefore, the hunter can move more freely without being detected.

However, hunting blinds can be difficult to set up and bulky to transport. Additionally, hunting blinds are often more akin to tent-like structures and do not blend in well with the environment.

Therefore what is needed is a hunting blind which allows for simple and efficient set-up and which appears to be a part of the environment which it is in. The present invention achieves this objective, as well as others that are explained in the following description.

BRIEF SUMMARY OF THE INVENTION

The present invention comprises a hunting blind for hunting animals on the ground. The hunting blind is generally comprised of a top member and multiple arms. The top member wraps around an existing tree. Multiple arms extend downward from the top member and away from the tree. Each arm either stakes into the ground or is held in place by other known means. The hunter can arrange each arm in any desired position to obtain the most realistic looking environment. The hunting blind forms an opening near the base of the tree for a hunter to sit in and stalk prey.

The easy set up and realistic appearance of the present hunting blind provides for an optimal hiding place for a hunter.

BRIEF DESCRIPTION OF THE SEVERAL VIEWS OF THE DRAWINGS

FIG. 4A is a perspective view, showing the attachment mechanism for top member of the hunting blind.

Figure 1:
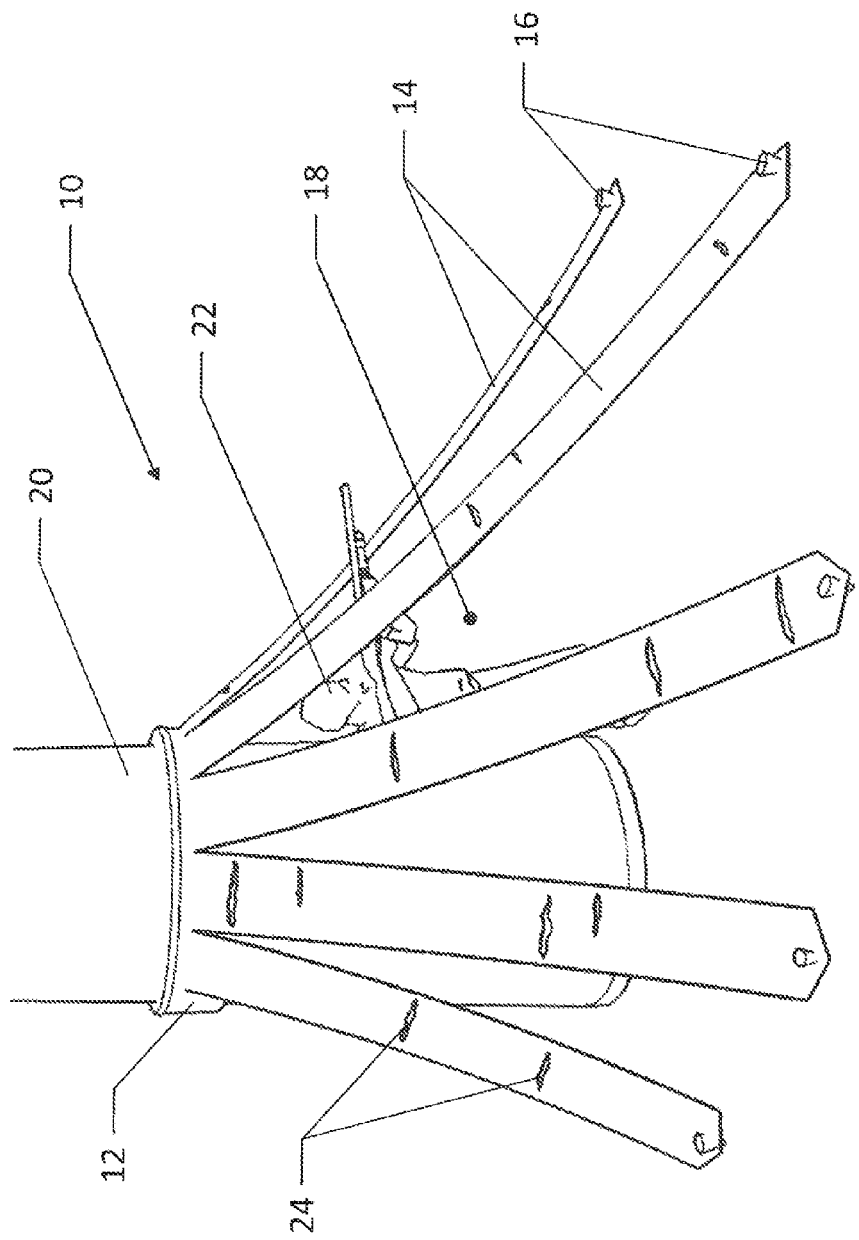
FIG. 1 is a perspective view, showing the present hunting blind attached to a tree.

| REFERENCE NUMERALS IN THE DRAWINGS | | | |
|---|---|---|---|
| 10 | blind | 12 | top member |
| 14 | arms | 16 | stakes |
| 18 | opening | 20 | tree |
| 22 | hunter | 24 | decorative element |
| 26 | first end | 28 | second end |
| 30 | rope | 32 | hooks |
| 34 | loop | 36 | stake holes |
| 38 | pocket | | |

DETAILED DESCRIPTION OF THE INVENTION

FIG. 1 illustrates the present invention in the preferred embodiment. The hunting blind 10 is primarily made up of top member 12 and a plurality of arms 14. Top member 12 attaches to a tree 20. Arms 14 stretch out away from tree such that an opening 18 is formed for hunter 22 to access. In the preferred embodiment, arms 14 are affixed to the ground using stakes 16. Hunting blind 10 is easy to set up and provides a natural and realistic addition to the surrounding environment. Arms 14 both create an opening 18 for hunter 22 while also camouflaging hunting blind 10 with the surrounding environment by appearing like an extension of a tree (e.g. root system) and/or surrounding bushes. In the preferred embodiment, arms 14 are made up of a flexible camouflage fabric and are different lengths. Each arm 14 can be selectively placed by hunter 22 in a desired position. Decorative elements 24 are optional, but create a realistic leafy look to hunting blind 10. Decorative elements 24 can either be small slits throughout the arms 14 or an added attachment affixed to arms 14.

Figure 2:
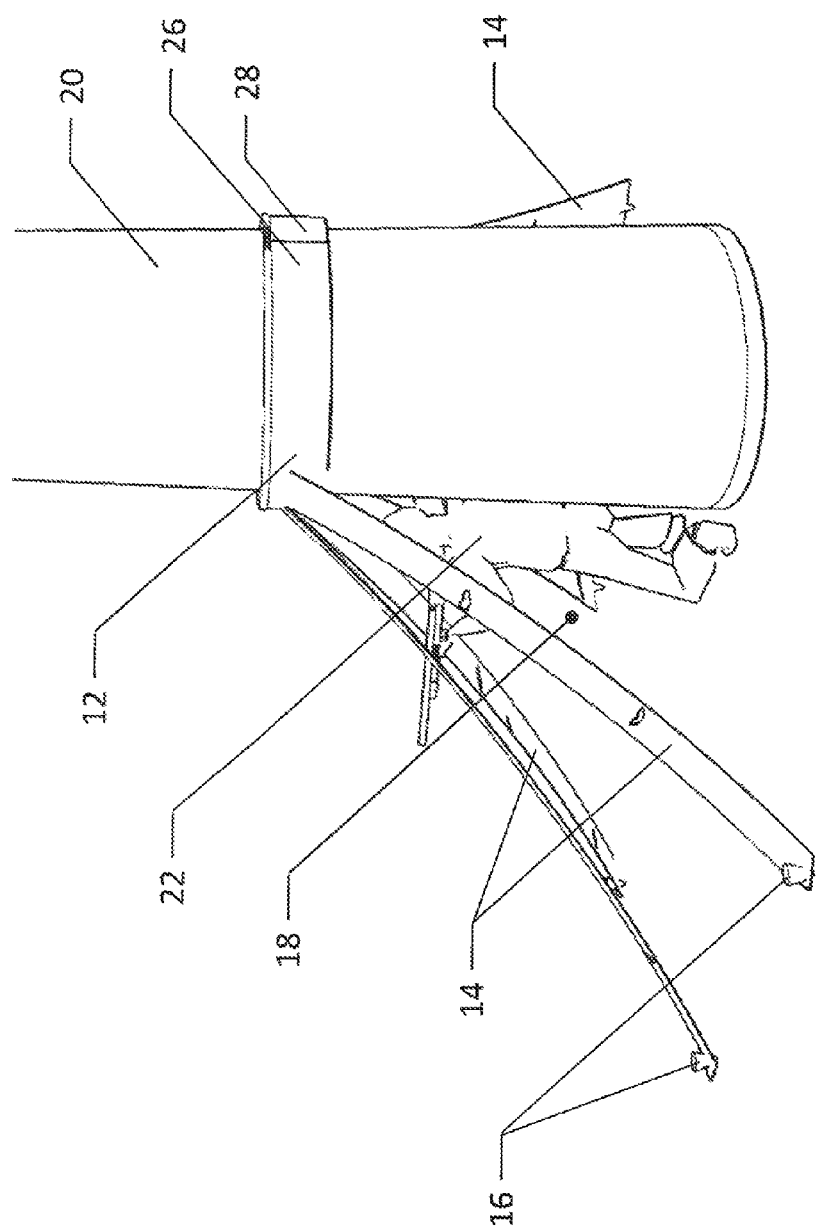
FIG. 2 is a perspective view, showing the present hunting blind attached to a tree.

A view from the back of hunting blind 10 is illustrated in FIG. 2. First end 26 of top member 12 wraps around tree 20 to attach to second end 28 of top member 12. Any manner of attaching top member 12 to tree 20 could be used (further illustrated in FIGS. 4 and 5). Tree 20 is illustrated as large in size; however hunting blind 10 could attach to any sized tree or tree-like structure. Stakes 16 fix arms 14 in place. In the alternative, weights at the end of each arm 14 could be used to set arms 14 in place along ground. Additionally, some arms 14 could attach to surrounding bushes or trees. If used in this manner, the hunter could simply tie arms to or hook arms over the surrounding tree or bush.

Figure 3:
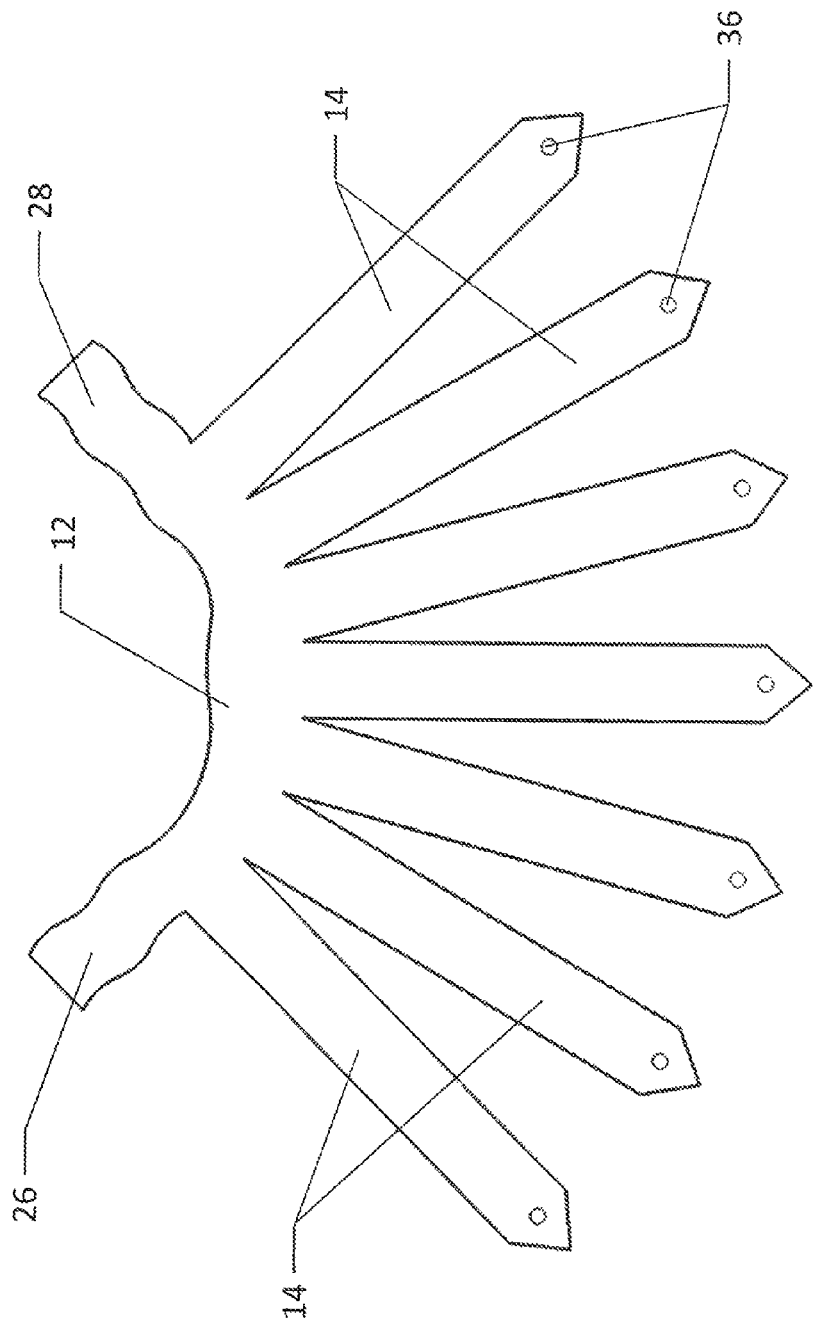
FIG. 3 is a perspective view, showing the present hunting blind.

FIG. 3 illustrates the present hunting blind 10 apart from the forest environment. Hunting blind 10 includes top member 12, which has a first end 26 and a second end 28. As previously described, these ends 26, 28 wrap around a tree and attach hunting blind 10 thereto. In the preferred embodiment there are eight arms 14, however hunting blind 10 could include any number of arms 14. In the preferred embodiment stake holes 36 are at the end of each arm 14. Hunting blind 10 is preferably made of a weather-resistant fabric and is therefore lightweight, easy to store and transport. The fabric could be easily rolled up or bunched up and stored in a hag or back pack.

Figure 4B:
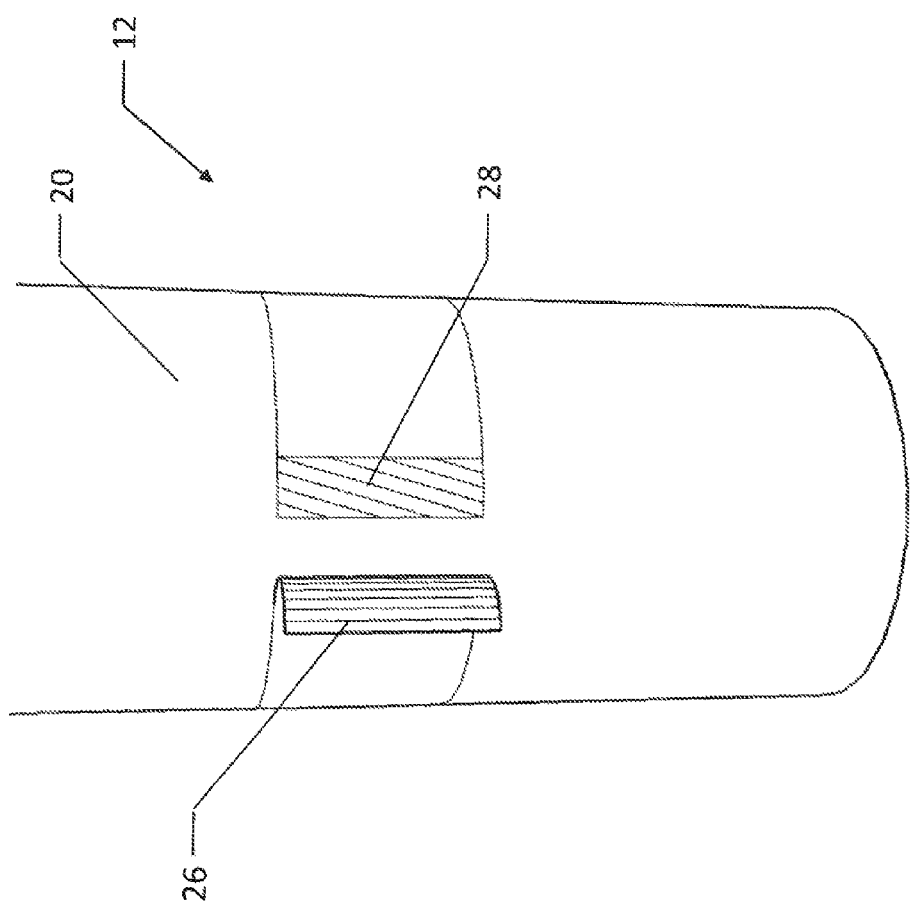
FIG. 4B is a perspective view, showing the attachment mechanism for top member of the hunting blind.

FIG. 4A illustrates the preferred embodiment to attach first end 26 of top member 12 around tree 20 to second end 28 of top member 12. As shown, top member 12 includes a small pocket 38 which rope 30 is threaded through. Rope 30 extends around top member 12 and out of each end 26, 28 to tie together around tree 20. FIG. 4B illustrates an alternate way of attaching first end 26 to second end 28 around tree 20. As shown, top member 12 includes a hook and loop fastener attachment; first end 26 has loops, while second end 28 has hooks.

The preceding description contains significant detail regarding the novel aspects of the present invention. It should not be construed, however, as limiting the scope of the invention but rather as providing illustrations of the preferred embodiments of the invention. As an example, built-in weights could be used to hold down arms 14 as opposed to stakes 16. Additionally, top member 12 can be attached around tree 20 in any known manner. Thus, the scope of the invention should be fixed by the following claims, rather than by the examples given.

Having described my invention, I claim:

1. A hunting blind for use by a hunter for attachment around a tree and to the ground, further comprising:
   a. a top member having a first end and a second end;
   b. a plurality of arms having a top side edge, at least three edges, a flat upper-side and a flat under-side;
   c. wherein said plurality of arms are attached directly to said top member by said top side edges such that said top side edge of at least one of said plurality of arms is contiguous with said top side edge of at least one other of said plurality of arms;
   d. wherein said top member is configured to wrap around said tree;
   e. wherein said plurality of arms extend away from said tree configured to provide an area of cover to said hunter;
   f. wherein an area of open space is formed between said plurality of arms; and
   g. wherein said area of open space is greater than said area of cover.

2. The hunting blind as recited in claim 1, further comprising a plurality of stakes configured to affix said plurality of arms to said ground.

3. The hunting blind as recited in claim 2, wherein said top member is attached around said tree by way of a hook and loop fastener attachment.

4. The hunting blind as recited in claim 2, wherein said top member further comprises a pocket containing a rope within said pocket, wherein said first end of said top member is connected around said tree to said second end of said top member by said rope.

5. The hunting blind as recited in claim 2, further comprising a plurality of slits on said plurality of arms.

6. The hunting blind as recited in claim 1, further comprising weights at the distal ends of said plurality of arms to position said plurality of arms to said ground.

7. The hunting blind as recited in claim 1, wherein said top member is made of a camouflage fabric.

8. The hunting blind as recited in claim 1, wherein said plurality of arms are made of a camouflage fabric.

9. A hunting blind used by a hunter, for attachment around a tree-like structure, further comprising:
   a. a top member having a first end and a second end;
   b. multiple arms having a length and a width and further comprising:
      i. a first side attached to said top member;
      ii. a first edge and a second edge along said length of said multiple arms;
      iii. a third edge at a distal end of said multiple arms configured to act as an anchor for each of said multiple arms;
      iv. a flat upper-side between said first edge and said second edge;
      v. a flat under-side between said first edge and said second edge;
   c. wherein said first side of said multiple arms are contiguous with at least one other first side of said multiple arms;
   d. wherein said first end of said top member and said second end of said top member attach said hunting blind to said tree-like structure;
   e. wherein said multiple arms extend away from said tree such that a plurality of openings are formed providing an area of open space between said lengths of said multiple arms;
   f. wherein an area of cover is provided by said multiple arms; and
   g. wherein said area of open space is greater than said area of cover.

10. The hunting blind as recited in claim 9, wherein said multiple arms are made of a camouflage fabric.

11. The hunting blind as recited in claim 9, wherein said tree-like structure is a pole.

12. The hunting blind as recited in claim 9, wherein said tree-like structure is a tree.

13. The hunting blind as recited in claim 9, further comprising at least eight arms.

14. The hunting blind as recited in claim 9, further comprising multiple stakes configured to affix said multiple arms to said ground at said distal end of said multiple arms proximate said third edge.

15. The hunting blind as recited in claim 9, further comprising weights at said distal ends of said multiple arms proximate said third edge.

16. The hunting blind as recited in claim 9, wherein said top member is attached around said tree by way of a hook and loop fastener attachment.

17. The hunting blind as recited in claim 9, wherein said top member further comprises a pocket containing a rope within said pocket, wherein said first end of said top member is connected around said tree to said second end of said top member by said rope.

18. The hunting blind as recited in claim 9, further comprising a plurality of slits on said multiple arms.

19. The hunting blind as recited in claim 9, wherein said third edge at said distal end of said multiple arms are configured to be capable of affixing to surrounding natural fixtures.

20. The hunting blind as recited in claim 9, wherein said flat upper-sides of said multiple arms are capable of providing cover to said hunter.

\* \* \* \* \*